(12) United States Patent
Patel

(10) Patent No.: US 6,907,523 B2
(45) Date of Patent: Jun. 14, 2005

(54) METHOD AND APPARATUS UTILIZING AN AGENT ON THE HOST PROCESSING SYSTEM TO INITIATE LOADING OF A PROGRAM IN RESPONSE TO AN EVENT AT THE HOST PROCESSING SYSTEM

(75) Inventor: Chinmay S. Patel, Chandler, AZ (US)

(73) Assignee: Intel Corporation, Santa Clara, CA (US)

( * ) Notice: Subject to any disclaimer, the term of this patent is extended or adjusted under 35 U.S.C. 154(b) by 681 days.

(21) Appl. No.: 09/747,530

(22) Filed: Dec. 22, 2000

(65) Prior Publication Data

US 2002/0083315 A1 Jun. 27, 2002

(51) Int. Cl.$^7$ .................. G06F 15/177; G06F 9/24; G06F 9/00; G06F 3/00
(52) U.S. Cl. ................. 713/100; 713/1; 713/2; 710/8; 710/15
(58) Field of Search ................ 713/1, 2, 100; 710/8, 15; 711/1, 2, 3, 4, 5, 6

(56) References Cited

U.S. PATENT DOCUMENTS

| | | | | |
|---|---|---|---|---|
| 5,471,603 A | * | 11/1995 | Yokote et al. ................ | 711/2 |
| 5,557,732 A | * | 9/1996 | Thompson ................... | 345/705 |
| 5,694,600 A | * | 12/1997 | Khenson et al. .............. | 713/2 |
| 5,787,246 A | * | 7/1998 | Lichtman et al. ............ | 709/220 |
| 5,832,283 A | * | 11/1998 | Chou et al. .................. | 713/1 |
| 6,009,480 A | * | 12/1999 | Pleso .......................... | 710/8 |
| 6,073,188 A | * | 6/2000 | Fleming ...................... | 710/38 |
| 6,105,130 A | * | 8/2000 | Wu et al. ..................... | 713/2 |
| 6,415,382 B1 | * | 7/2002 | Kwan .......................... | 713/2 |
| 6,477,482 B1 | * | 11/2002 | Maupin et al. .............. | 702/183 |
| 6,594,721 B1 | * | 7/2003 | Sakarda et al. .............. | 713/300 |

FOREIGN PATENT DOCUMENTS

JP  11195000 A  *  7/1999  ........... G06F/15/00

OTHER PUBLICATIONS

White, Ron; "PC Computing How Computers Work", 1994, Ziff–Davis Press, pp.: 14–17.*
Ralston, A., Riely, E. D., "Encyclopedia of Conmputer Science", 1993, Van Nostrand Reinhold, pp.: 140, 855 and 1052.*

* cited by examiner

*Primary Examiner*—Lynne H. Browne
*Assistant Examiner*—James Trujillo
(74) *Attorney, Agent, or Firm*—Grossman, Tucker, Perreault & Pfleger, PLLC

(57) ABSTRACT

Disclosed are a system and method of launching a program on a host processing system from instructions provided by a peripheral device coupled to the host processing system. An agent residing on the host processing system initiates the loading of a program stored in a memory of the peripheral device on the host processing system in response to detection of an event at the host processing system. In response to detecting the event, the agent may initiate a reboot of the host processing system to load a bootable image to the host processing system from instructions stored on the peripheral device. A utility program may also be launched on the host processing system under the control of the operating system loaded from the peripheral device.

27 Claims, 3 Drawing Sheets

METHOD AND APPARATUS UTILIZING AN AGENT ON THE HOST PROCESSING SYSTEM TO INITIATE LOADING OF A PROGRAM IN RESPONSE TO AN EVENT AT THE HOST PROCESSING SYSTEM

BACKGROUND

1. Field

The subject matter disclosed herein relates to systems and methods of loading programs to a processing system. In particular, the subject matter disclosed herein relates to systems and method of loading programs to a processing system in response to events.

2. Information

The emergence of enterprise data centers has created a need for rapid and reliable storage and retrieval of information in support of network based applications and services. Such data centers are typically supported by server systems which comprise one or more host processing systems coupled to peripheral devices such as input/output (I/O) subsystems. Such an I/O subsystem typically includes a controller for a redundant array of inexpensive disks (RAID) to provide fast and reliable storage and retrieval of data.

A peripheral device such as an I/O subsystem is typically coupled to a host processing system by a data bus. Utility programs are typically hosted on the host processing to perform services related to the peripheral device such as, for example, diagnostics (e.g., trouble shooting), configuration and setup. These utility programs typically transmit data to or receive data from the peripheral device over the data bus and may provide a display to an operator at a user interface.

Such utility programs are typically configured to be hosted on a particular operating systems of a host processing system which is coupled to a peripheral device in question through a data bus. For example, such a utility program may be hosted on an operating system of the host processing system and communicate with the peripheral device in question. Accordingly, for a particular peripheral device to be used with a host processing system, developers of the utility programs typically create different versions of a utility program for different operating system environments which may be hosted on a host processing system.

BRIEF DESCRIPTION OF THE FIGURES

Non-limiting and non-exhaustive embodiments of the present invention will be described with reference to the following figures, wherein like reference numerals refer to like parts throughout the various figures unless otherwise specified.

DETAILED DESCRIPTION

Figure 1:
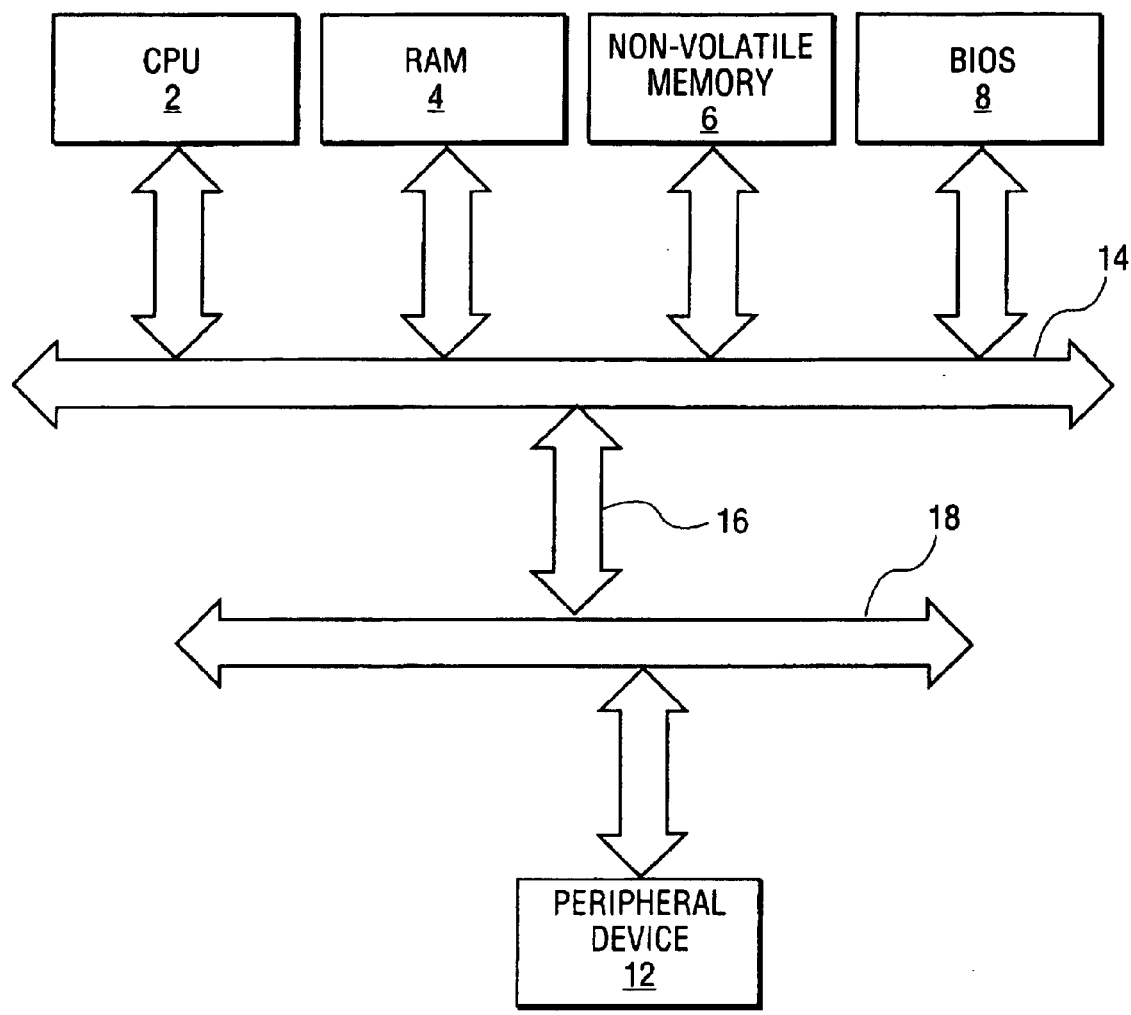
FIG. 1 shows a schematic diagram of a processing platform according to an embodiment of the present invention.

Reference throughout this specification to "one embodiment" or "an embodiment" means that a particular feature, structure, or characteristic described in connection with the embodiment is included in at least one embodiment of the present invention. Thus, the appearances of the phrase "in one embodiment" or "an embodiment" in various places throughout this specification are not necessarily all referring to the same embodiment. Furthermore, the particular features, structures, or characteristics may be combined in one or more embodiments.

A "processing system" as discussed herein relates to a combination of hardware and software resources for accomplishing computational tasks. However, this is merely an example of a processing system and embodiments of the present invention are not limited in this respect. A "host processing system" relates to a processing system which may be adapted to communicate with a "peripheral device." For example, a peripheral device may provide inputs to or receive outputs from an application process hosted on the host processing system. However, these are merely examples of a host processing system and a peripheral device, and embodiments of the present invention are not limited in this respect.

An "operating system" as discussed herein relates to one or more encoded procedures for facilitating communication between application procedures and processing resources of a processing system. Such an operating system may allocate processing resources to application procedures and provide an application programming interface (API) comprising callable software procedures for execution on the processing resources in support of application procedures. However, these are merely examples of an operating system and embodiments of the present invention are not limited in this respect.

A "utility" or "utility program" as referred to herein relates to a program for managing or monitoring resources of a processing system. Such a utility may include, for example, programs for diagnostics (including but not limited to troubleshooting), configuration of peripheral devices or resources or setting up parameters to enable capability. However, these are merely examples of utilities and embodiments of the present invention are not limited in this respect.

A "boot procedure" as discussed herein relates to a procedure by which initial instructions are loaded to a memory of a processing system and then executed. For example, a boot procedure may involve loading an operating system to a memory of a processing system. This may be preceded by the execution of instructions provided by a basic input/output system (BIOS) associated with the processing system which instructs the processing system to retrieve instructions from a non-volatile memory device for providing an operating system. However, this is merely an example of a boot procedure and embodiments of the present invention are not limited in this respect.

A "system reset" procedure as discussed herein relates to a procedure by which a processing system is reset from a state in which a previously loaded process is hosted on the processing system. For example, a system reset procedure may involve halting a previously loaded operating system and loading instructions for a subsequent operating system to a memory of the processing system. This may be preceded by an execution of instructions provided by a BIOS to retrieve instructions for the subsequent operating system from a non-volatile memory. However, this is merely an example of a system reset procedure and embodiments of the present invention are not limited in this respect. A system reset procedure may be performed as part of a re-boot procedure in which power is removed from at least a part of the processing system. However, such a system reset procedure may also be performed without the removal of power from subsystems of the processing system. In either case, these are merely examples of a system reset procedure and embodiments of the present invention are not limited in this respect.

A "bootable image" as discussed herein relates to instructions which may be stored in a memory for loading to a target processing system during a boot or system reset procedure. For example, a bootable image may provide instructions for an operating system to be hosted on a target processing system. In one embodiment, a bootable image may be stored in a memory device at a memory address prior to being loaded to a processing system by BIOS routines during a boot or system reset procedure. However, these are merely examples of a bootable image and embodiments of the present invention are not limited in this respect.

A program "launch" as referred to herein relates to an initiation of an execution of the program on a processing system. This may occur, for example, upon an initiation of the execution of instructions for the program at a location in a system memory of the processing system. However, this is merely an example of a program launch and embodiments of the present invention are not limited in this respect.

An "agent" as referred to herein relates to a process hosted on a processing system which is related to one or more processes executing externally from the processing system. For example, an agent may be hosted on a processing system to detect events at the processing system and communicate with an external process in response to the event. However, this is merely an example of an agent and embodiments of the present invention are not limited in this respect.

A "data bus" as referred to herein relates to circuitry for transmitting data between devices. For example, a data bus may transmit data between a host processing system and a peripheral device. However, this is merely an example and embodiments of the present invention are not limited in this respect. A "bus transaction" as referred to herein relates to an interaction between devices coupled in a data bus structure wherein one device transmits data addressed to the other device through the data bus structure.

Briefly, an embodiment of the present invention relates to a system and method of launching a program on a host processing system from instructions provided by a peripheral device coupled to the host processing system. According to an embodiment, an agent residing on the host processing system initiates the loading of a program stored in a memory of the peripheral device on the host processing system in response to detection of an event at the host processing system. For example, in response to detecting the event the agent may initiate a system reset of the host processing system to load an operating system onto the host processing system from instructions stored on the peripheral device. A utility program may also be launched on the host processing system under the control of the operating system loaded from the peripheral device. However, this is merely an example and embodiments of the present invention are not limited in this respect.

FIG. 1 shows a schematic diagram of a processing platform 10 according to an embodiment of the present invention. A central processing unit (CPU) 2 is coupled through a bus 14 to a random access memory (RAM) 4, basic input/output system (BIOS) 6 and a non-volatile memory (NVM) 8 such as a hard disk drive or flash memory device. Devices on the bus 14 may provide a host processing system which hosts software processes for performing computational tasks. However, this is merely an example of a host processing system and embodiments of the present invention are not limited in this respect.

The devices coupled to the bus 14 may also be coupled to a peripheral device 12 on a bus 18 which is coupled to the bus 14 through a bridge 16. The bus 18 may any one of several types of data buses such as a peripheral components interconnect (PCI) bus. However, this is merely an example of a data bus and embodiments of the present invention are not limited in this respect. The peripheral device 12 may be an input/output (I/O) controller which provides inputs to and receives outputs from processes executing on the CPU 2. For example, the peripheral device 12 may be an Intelligent I/O subsystem comprising a processing unit, RAM and non-volatile memory for hosting processes. However, these are merely examples of a peripheral device and embodiments of the present invention are not limited in this respect. According to an embodiment, an agent hosted on the CPU 2 and RAM 4 may initiate the loading of a program to the CPU 2 and RAM 4 in response to detecting an event. For example, the agent may load the program by initiating the transmission of a bootable image from the peripheral device 12 to the RAM 4 through the bus 18. However, this is merely an example of how such an agent may initiate the loading of a program to a host processing system and embodiments of the present invention are not limited in this respect.

Figure 2:
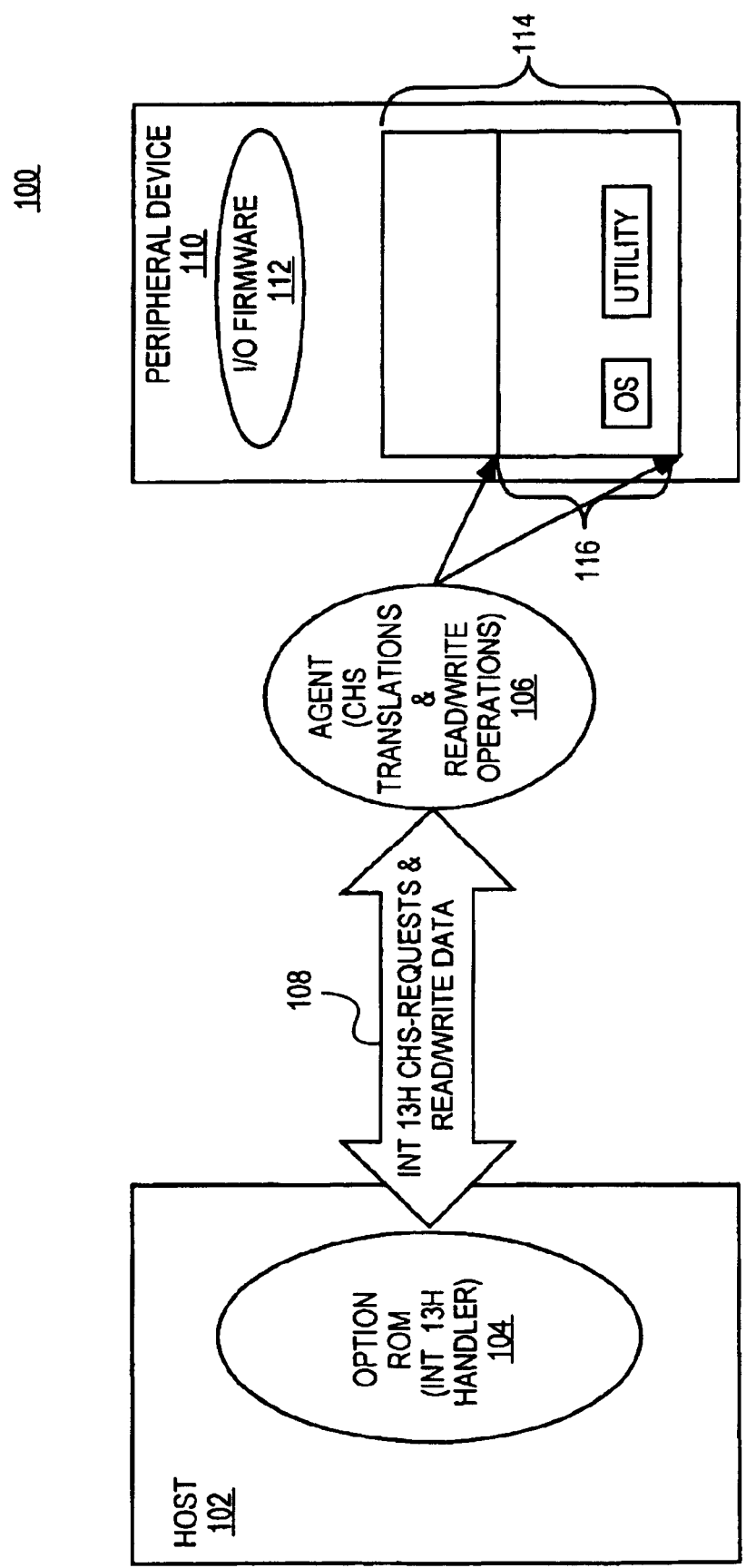
FIG. 2 shows a schematic diagram illustrating a system for loading a bootable image to a host processing system according to an embodiment of the present invention.
Figure 3:
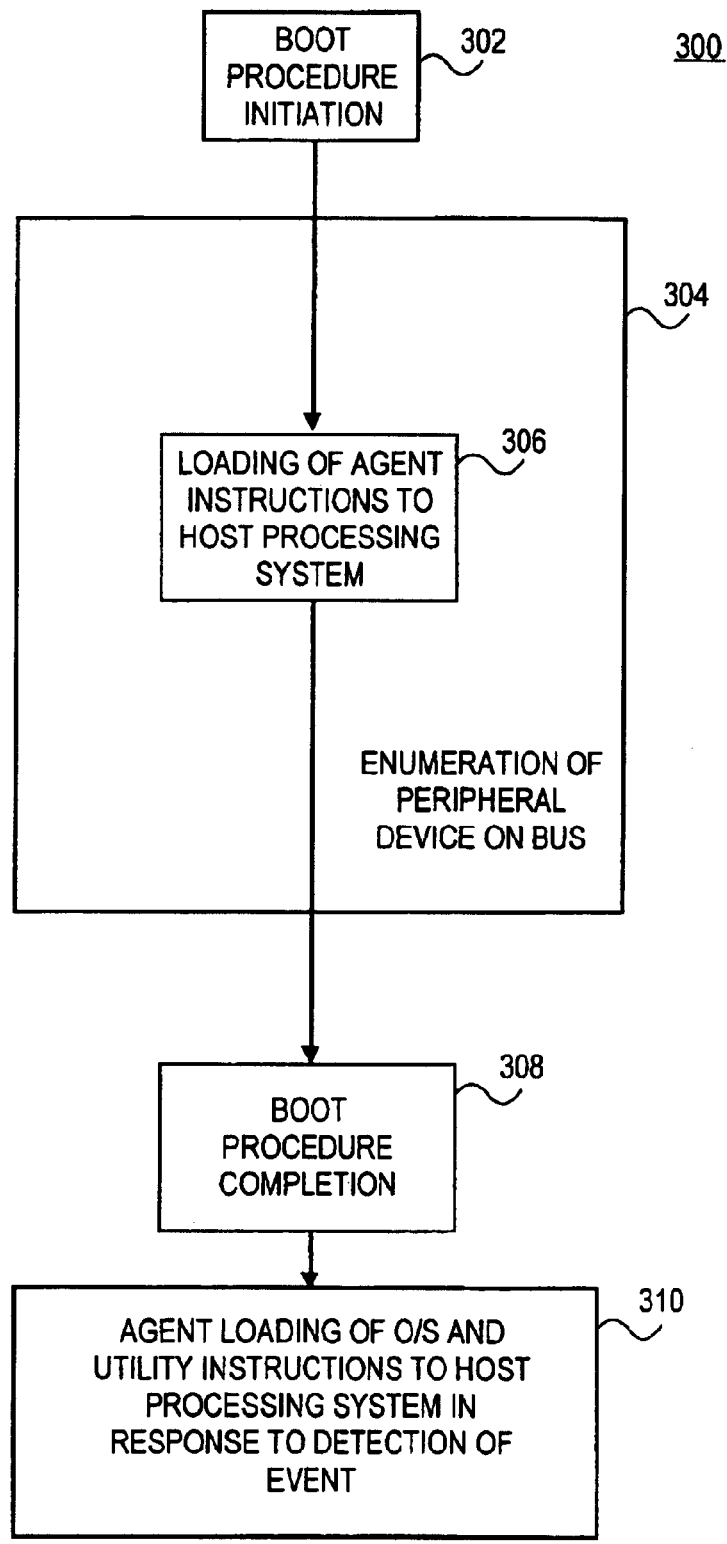
FIG. 3 shows a flow diagram illustrating an enumeration of a peripheral device on a data bus.

FIG. 2 shows a schematic diagram illustrating interactions between a host processing system 102 and a peripheral device 110 to load instructions from the peripheral device 110 to the host processing system 102 for execution. According to an embodiment, an agent 106 of the peripheral device is hosted on the host processing system from instructions stored in a non-volatile memory 114 of the peripheral device 110. Upon detection of an event at the host processing system 102, the agent 106 initiates a procedure which loads instructions from a reserved portion 116 of the non-volatile memory 114 for execution on the host processing system 102. In one embodiment, the agent 106 will cause the host processing system 102 to perform a system reset and load an operating system to the host processing system from instructions stored in the reserved portion 116. However, this is merely an example of how instructions from a memory of a peripheral device may be loaded for execution on a host processing system and embodiments of the present invention are not limited in this respect.

According to an embodiment, the agent 106 may be launched on the host processing system 102 as part a boot procedure. Following installation of the agent 106, the host processing system 102 may install an operating system from a non-volatile memory of the host processing system 102 to complete a boot procedure. In an embodiment in which the peripheral device 110 is coupled to the host processing system 102 by a PCI bus, for example, the agent 106 may be loaded to a memory of the host processing system 102 as part of a procedure to enumerate the peripheral device. Here, the host processing system 102 may retrieve instructions the non-volatile memory 114 through one or more bus transactions in the course of a bus enumeration procedure. For example, peripheral device 110 may provide data in the course of such a bus enumeration procedure (e.g., data provided in configuration header data of the peripheral device 110) which indicates whether data is to be retrieved from an expansion ROM and the size and/or location of the data in the non-volatile memory 114. However, this is merely an example of how data from a non-volatile memory of a peripheral device may be provided to a host processing system in an enumeration procedure and embodiments of the present invention are not limited in this respect.

In another embodiment, the agent 106 may be loaded to the host processing system 102 from a non-volatile memory on the host processing system (e.g., from a BIOS flash) as part of a BIOS routine internal to the host processing system 102. However, these are merely examples of how an agent may be loaded to a host processing system and embodiments of the present invention are not limited in this respect.

According to an embodiment, the agent 106 may detect an event at the host processing system 102 to initiate a procedure to load instructions to a host processing system 102. Such an event may include, for example, events occurring at a user interface of the host processing system 102 such as a combination of keystrokes at a keyboard or other inputs to another peripheral device associated with a user interface. Also, the agent 106 may detect an "event" as one or more conditions associated with the host processing system 102 which is independent of inputs to a user interface. However, these are merely examples of events which may be detected by an agent and embodiments of the present invention are not limited in this respect. In one embodiment, the agent 106 may comprise an event handler (e.g., a keyboard event handler) which hooks with a device driver associated with an input device such as a keyboard. Such an event handler may detect events (such as a combination of keystrokes at a keyboard) and commence the execution of one or more procedures. However, this is merely an example of how an agent may detect a predetermined event and embodiments of the present invention are not limited in this respect.

According to an embodiment, upon detection of a predetermined event at the host processing system, the agent 106 may initiate a procedure to load a program to the host processing system 102 from instructions stored in the reserved portion 116 of the nonvolatile memory 114. For example, the procedure may load a bootable image as part of a system reset procedure initiated by the agent 106. The bootable image may comprise an operating system and one or more utility programs to be hosted on the operating system. However, this is merely an example of how an agent may load a program to a host processing system from a memory of a peripheral device and embodiments of the present invention are not limited in this respect.

According to an embodiment, the agent 106 may respond to detection of a predetermined event by initiating the execution of an interrupt routine for loading a bootable image to the host processing system 102. In an embodiment in which the host processing system 102 comprises a BIOS supporting interrupt vectors for accessing devices, for example, the agent 106 may respond to detection of a predetermined event by modifying one or more interrupt vectors, and initiating a system reset of the host processing system 102 comprising loading a bootable image based upon instructions stored in the reserved portion 116 of the non-volatile memory 114. However, this is merely an example of a how an agent may initiate the execution of an interrupt routine for loading a bootable image to a host processing system and embodiments of the present invention are not limited in this respect.

In an embodiment in which the host processing system 102 is based upon an architecture such as the IBM PC-AT compatible architecture, for example, the agent 106 may modify the interrupt vector 13 h to execute instructions from a location in a RAM (of the host processing system 102) instead of a master boot record (MBR) at a location in a non-volatile memory. For example, the agent 106 may re-map an address in the interrupt vector 13 h from an address of the MBR in a Cylinder-Head-Sector (CHS) of a nonvolatile memory to an address where the instructions of the routine are stored in the RAM. The modified address in the interrupt vector 13 h may then reference to a location in the RAM which stores instructions of a routine to retrieve instructions for a bootable image from the peripheral device 110 to be loaded to the host processing system 102 in a boot procedure or system reset procedure. However, this is merely an example of how a bootable image may be loaded to a host processing system and embodiments of the present invention are not limited in this respect.

According to an embodiment, the bootable image loaded from the peripheral device 110 to the host processing system 102 may comprise instructions for an operating system and a utility program to be supported by the operating system. Such an operating system may be any one of several operating systems which may be hosted on a host processing system including, for example, versions of Solaris™ provided by Sun Microsystems, Linux, versions of DOS or Windows™ sold by Microsoft Corp., or versions of versions VxWorks™ or pSOS™ sold by WindRiver Systems, Inc. However, these are merely examples of operating systems which may be loaded from a peripheral device to a host processing system and embodiments of the present invention are not limited in this respect.

In an embodiment in which the operating system is a version of MS DOS, for example, the utility program may be launched contemporaneously with the loading of the operating system in an "AUTOEXEC.BAT" routine of the operating system. However, this is merely an example of how a bootable image may be installed on a host processing system to provide an operating system and a utility program, and embodiments of the present invention are not limited in this respect.

According to an embodiment in which a bootable image (loaded from the peripheral device 110 to the host processing system 102) comprises a utility program, such a utility program may communicate with a user through a graphical user interface (GUI) supported by the host processing system 102. For example, the utility program may comprise an interface encoded in a hypertext markup language (HTML) and the utility program may be launched with a network browser such as versions of Netscape Navigator™ or Internet Explorer™ provided by Microsoft Corporation. However, this is merely an example of how a utility program may be integrated as part of a bootable image and embodiments of the present invention are not limited in this respect.

According to an embodiment, the agent 106 may respond to detection of a predetermined event by initiating the preparation of a bootable image at the peripheral device 110 prior to being loaded to the host processing system 102. For example, upon detecting an event at the host processing system 102, the agent 106 may transmit a message through a data bus to the peripheral device 110 to initiate a launch of a RAM driver on the peripheral device 110. In the illustrated embodiment, the RAM driver retrieves the instructions of a subsequent operating system from the reserved portion of the non-volatile memory 116 and the instructions of the one or more utility programs to be hosted on the subsequent operating system. The RAM driver may then integrate the subsequent operating system with the utility program to create a bootable image on the RAM of the peripheral device 110. However, this is merely an example of how the RAM driver may prepare a bootable image to be transmitted to the host processing system 102 and embodiments of the present invention are not limited in this respect. The bootable image may then be transmitted from the RAM of the peripheral device to the host processing system 102 in response to a reboot procedure. However, this is merely an example of how a bootable image may be prepared for hosting on a host processing system and embodiments of the present invention are not limited in this respect.

While there has been illustrated and described what are presently considered to be example embodiments of the present invention, it will be understood by those skilled in the art that various other modifications may be made, and equivalents may be substituted, without departing from the true scope of the invention. Additionally, many modifications may be made to adapt a particular situation to the teachings of the present invention without departing from the central inventive concept described herein. Therefore, it is intended that the present invention not be limited to the particular embodiments disclosed, but that the invention include all embodiments falling within the scope of the appended claims.

What is claimed is:

1. An apparatus comprising:
   a host processing system comprising a non-volatile memory and a random access memory; and
   a peripheral device comprising an intelligent I/O subsystem comprising a processing unit, said peripheral device also comprising a storage medium comprising machine-readable instructions stored thereon for initiating, by said peripheral device, an agent to reside on the host processing system, said agent capable of detecting a predetermined event in said host processing system, the agent comprising:
   logic to modify an interrupt vector address to specify execution of machine-readable instructions at a location in the random access memory instead of at a location in the non-volatile memory; and
   logic to initiate a reset procedure at the host processing system to commence execution of machine-readable instructions at the location in the random access memory in response to said predetermined event at the host processing system.

2. The apparatus of claim 1, wherein the agent further comprises logic to load machine-readable instructions at the location in the random access memory for retrieving one or more programs from the storage medium of the peripheral device, the one or more programs comprising an operating system.

3. The apparatus of claim 2, wherein the one or more programs comprises a utility program and the agent further comprises logic to launch the utility program following a launch of the operating system in response to detection of the predetermined event.

4. The apparatus of claim 1, wherein the predetermined event comprises an event at a user interface of the host processing system.

5. The apparatus of claim 1, wherein the apparatus further comprises a data bus coupled between the host processing system and the peripheral device, and wherein the peripheral device further comprises logic for transmitting machine-readable instructions to the host processing system for creating the agent response to a procedure to enumerate the peripheral device on the bus.

6. The apparatus of claim 1, wherein the non-volatile memory comprises a master boot record at the location in the non-volatile memory.

7. The apparatus of claim 6, wherein the location in the non-volatile memory corresponds with a cylinder-head-sector of the non-volatile memory.

8. A method comprising:
   loading machine-readable instructions to a location in a random access memory of a host processing system, the host processing system comprising a non-volatile memory, the machine-readable instructions comprising machine-readable instructions to retrieve one or more programs from a peripheral device comprising an intelligent I/O subsystem comprising a processing unit, initiating, by said peripheral device, an agent to reside on said host processing system, said agent capable of detecting a predetermined event in said host processing system;
   modifying, by said agent, an interrupt vector address to specify execution of machine-readable instructions at the location in the random access memory instead of at a location in the non-volatile memory; and
   initiating, by said agent, a reset procedure at the host processing system to commence execution of machine-readable instructions in the location at the random access memory in response to a predetermined event at the host processing system.

9. The method of claim 8, wherein the one or more programs comprise an operating system and the method further comprises launching the operating system to the host processing system.

10. The method of claim 9, wherein the one or more programs comprises a utility program and the method further comprises launching the utility program following a launch of the operating system in response to detection of the predetermined event.

11. The method of claim 8, wherein the predetermined event comprises an event at a user interface of the host processing system.

12. The method of claim 8, wherein the method further comprises transmitting machine-readable instructions for modifying the interrupt vector address from the peripheral device to the host processing system through a data bus coupled between the host processing system and the peripheral device contemporaneously with a procedure to enumerate the peripheral device on the data bus.

13. The method of claim 8, wherein the non-volatile memory comprises a master boot record at the location in the non-volatile memory.

14. The method of claim 13, wherein the location in the non-volatile memory corresponds with a cylinder-head-sector of the non-volatile memory.

15. An article comprising:
   a storage medium comprising machine-readable instructions stored thereon for: loading machine-readable instructions to a location in a random access memory of a host processing system, the host processing system comprising a non-volatile memory, the machine-readable instructions comprising machine-readable instructions to retrieve one or more programs from a peripheral device comprising an intelligent I/O subsystem comprising a processing unit, initiating, by said peripheral device, an agent to reside on said host processing system, said agent capable of detecting a predetermined event in said host processing system;
   modifying, by said agent, an interrupt vector address to specify execution of machine-readable instructions at the location in the random access memory instead of at a location in the non-volatile memory; and
   initiating, by said agent, a reset procedure at the host processing system to commence execution of machine-readable instructions in the location in the random access memory in response to a predetermined event at the host processing system.

16. The article of claim 15, wherein the one or more programs comprise an operating system.

17. The article of claim 16, wherein the one or more programs comprise a utility program and the storage medium further comprises machine-readable instructions stored thereon to launch the utility program following a launch of the operating system in response to detection of the predetermined event.

18. The article of claim 15, wherein the predetermined event comprises an event at a user interface of the host processing system.

19. The article of claim 15, wherein the non-volatile memory comprises a master boot record at the location in the non-volatile memory.

20. The article of claim 19, wherein the location in the non-volatile memory corresponds with a cylinder-head-sector of the non-volatile memory.

21. A peripheral device comprising an intelligent I/O subsystem comprising a processing unit; logic to transmit machine-readable instructions to a host processing system through a data bus, the machine-readable instructions comprising instructions for initiating an agent on the host processing system, said agent capable of detecting a predetermined event in said host processing system, the agent comprising:

logic to modify an interrupt vector address to specify execution of machine-readable instructions at a location in a random access memory of the host processing system instead of at a location in a non-volatile memory of the host processing system; and logic to initiate a reset procedure at the host processing system to commence execution of machine-readable instructions in the location in the random access memory in response to a predetermined event at said host processing system.

22. The peripheral device of claim 21, the peripheral device further comprising:

an interface to a data bus for transmitting data to the data bus; and logic to transmit the machine-readable instructions for hosting the agent to the host processing system contemporaneously with a procedure for enumerating the peripheral device on the data bus.

23. The peripheral device of claim 21, wherein the agent further comprises:

logic to load machine-readable instructions from the peripheral device to the location in the random access memory for one or more programs comprising an operating system; and logic to initiate a system reset procedure of the host processing system to launch the operating system to the host processing system in response to detection of the predetermined event.

24. The peripheral device of claim 23, wherein the one or more programs comprise a utility program and the agent further comprises logic to launch the utility program following a launch of the operating system in response to detection of the predetermined event.

25. The peripheral device of claim 21, wherein the predetermined event comprises an event at a user interface of the host processing system.

26. The peripheral device of claim 21, wherein the non-volatile memory comprises a master boot record at the location in the non-volatile memory.

27. The apparatus of claim 26, wherein the location in the non-volatile memory corresponds with a cylinder-head-sector of the non-volatile memory.

* * * * *

UNITED STATES PATENT AND TRADEMARK OFFICE
CERTIFICATE OF CORRECTION

PATENT NO. : 6,907,523 B2
DATED : June 14, 2005
INVENTOR(S) : Chinmay S. Patel

It is certified that error appears in the above-identified patent and that said Letters Patent is hereby corrected as shown below:

Title page,
Item [56], References Cited, OTHER PUBLICATIONS, "Ralston, A., Riely, E. D." reference, delete "Conmputer" and insert -- Computer --, therefor.

Signed and Sealed this

Twentieth Day of September, 2005

JON W. DUDAS
*Director of the United States Patent and Trademark Office*